US006049822A

United States Patent [19]

Mittal

[11] Patent Number: 6,049,822

[45] Date of Patent: *Apr. 11, 2000

[54] METHOD FOR GENERATING AND UPDATING KNOWLEDGE-BASED CONFIGURATORS THAT ARE MULTI PLATFORM AND MULTI LANGUAGE CAPABLE

[75] Inventor: Sanjay Mittal, Fremont, Calif.

[73] Assignee: Selectica, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,594

[22] Filed: Oct. 31, 1997

[51] Int. Cl.[7] ...................................................... G06F 13/00
[52] U.S. Cl. ......................... 709/217; 709/202; 709/302; 707/104; 707/501
[58] Field of Search .................................... 709/200, 201, 709/202, 203, 204, 205, 206, 217, 219, 300, 302; 707/10, 102, 104, 500, 501, 513

[56] References Cited

U.S. PATENT DOCUMENTS

| 5,710,900 | 1/1998 | Anand et al. | 345/339 |
| 5,748,188 | 5/1998 | Hu et al. | 345/326 |
| 5,784,539 | 7/1998 | Lenz | 706/45 |
| 5,870,768 | 2/1999 | Hekmatpour | 707/501 |
| 5,887,133 | 3/1999 | Brown et al. | 709/200 |

*Primary Examiner*—Viet D. Vu
*Attorney, Agent, or Firm*—Donald R. Boys; Central Coast Patent Agency

[57] ABSTRACT

A method for creating and disseminating knowledge-based object models converts object models created on a source platform to a first human-readable flat file prior to transmission on a network, allowing object models to be transported across differing platforms incorporating different languages. At a network receiving station, a transmitted flat file is read and the object model is recreated by a run-time engine. In some embodiments flat files created on the source platform are used by a graphical user interface (GUI) model builder to create a GUI object model associated with the first object model, which is converted to a second flat file to be transported to a receiving station along with the first flat file. Both flat files in this embodiment are used at the receiving station to recreate the associated object models. In further embodiments multimedia files are generated on the source platform and associated with the GUI object model, and transported to the receiving station along with the flat files.

5 Claims, 1 Drawing Sheet

METHOD FOR GENERATING AND UPDATING KNOWLEDGE-BASED CONFIGURATORS THAT ARE MULTI PLATFORM AND MULTI LANGUAGE CAPABLE

FIELD OF THE INVENTION

The present invention is in the field of computer aided sales and advertising and has particular application to software applications for generating and using Knowledge Bases.

BACKGROUND OF THE INVENTION

Computer aided sales presentations wherein rules-based configurators are employed have long been a valuable tool for allowing a customer or client to configure his or her own order of a product or products. This technique is employed in a network environment whereby a client configures his or her order and sends it over the Internet, or another type of network, to a seller which can fill the order. For example, a complex computer system has many different features, accessories, options, etc. With the appropriate software program, a client can configure his or her own custom order for a particular brand or type of system. By employing an interactive method a client can apply certain desired features in his product-order configuration that were chosen from options provided by a seller.

More recently, it is known to the inventor that object-oriented, constraint-based configurators have begun to replace rules-based configurators by virtue of their more flexible organization. For example, rules-based configurators rely on set rules that are programmed in a procedural computer language. Partly for this reason, every change in the merchandise offered may require substantial changes in the software, which can be quite a lot of work, considering the fast pace of trade today. However, what is needed is a separation between the product configuration knowledge and the process that manipulates the knowledge base. With such separation, the knowledge base can be changed easily via an editing process. The knowledge base applies the changes via linking to other elements of the process such as the object model. However the object models are dependent on the language and platform used for implementation of the knowledge base. Generally programming is required to initiate revision to the product across several platforms.

Generally speaking, an object model representing a product, such as a new automobile, is created using a programming language within a model building application at the sellers end. This object model contains all of the descriptive elements and various features including cost information about the object it represents. A model writer procedure then writes a binary file, which is readable only to applications written in the same environment. These object models can then be presented to a client having the appropriate software application on the correct platform and using the required language. The client can then enter his desired choices or options via interactive software. A configurator commonly known as a run-time engine insures that the client's choices are applied correctly. The configurator is also adapted to negate any conflict or impossibility that may arise from the client's directives.

A difficulty with the current state of the art, which has hampered fast deployment of knowledge bases severely, is that although a knowledge base is superior to a rules base as described above, the knowledge base is language-dependent and not easily transferred across different platforms (i.e. IBM to Macintosh, or even Win 3.1 vs. Win 95). For example, a client would be required to operate in the same computer platform and language to be able to interactively configure his desired purchase. This is a serious problem because it severely limits the targeted on-line community that a seller may reach.

What is clearly needed is a method and apparatus wherein a knowledge base can be transportable across divergent types of computer platforms and languages.

SUMMARY OF THE INVENTION

In a preferred embodiment of the present invention a method for transmitting a knowledge-base object model from a source platform to a recipient platform via a data network is provided, comprising steps of (a) converting the object model into a human-readable flat file at the source platform; (b) transporting the flat file across the data network from the source platform to the recipient platform; and (c) reconstructing the object model at the recipient platform from the human-readable flat file. The network can be an Intranet wide area network, a local area network, the Internet, or any other network connection. The method allows object models to be widely disseminated without regard to the type of computers connected, operating systems, or languages used.

In some embodiments the first flat file is used to create a graphical user interface (GUI) object model, the GUI object model is converted into a second human-readable flat file associated with the first flat file, and both files are transported across the network. At a receiving station the flat files are reconstructed into object models by use of a run-time engine. In some embodiments multi-media files are also created and associated with the GUI object model. These files are transported to the receiving station with the flat files.

In conjunction with the methods taught, a system is provided for wide dissemination of object models comprising an object model generator adapted as a tool to create object models, and executing on a source platform; a flat-file writer executing on the source platform; a flat file reader executing on a recipient platform connected by a network connection to the source platform; and a run-time engine executing on the recipient platform and adapted to regenerate object models from received flat files. An object model created on the source platform by use of the object model generator is converted by the flat file writer to a flat file, which is transported to the recipient platform via the network connection, read by the flat-file reader, and reconverted to an object model. The network connection may be to any type of network, including the Internet.

In the system provided, a first flat file generated from an object model may be used by a graphical user interface (GUI) builder to create a GUI object model associated with the first object model, which is also rendered as a flat file, and both associated flat files may be transmitted to a recipient station, where the object models may be reconstructed. In the systems of the invention object models are transmitted between different types of computers using different operating systems and languages, providing thereby for broader than usual dissemination of object models.

BRIEF DESCRIPTION OF THE DRAWING FIGURES

FIG. 1 is a flow chart illustrating a procedure for a knowledge base application according to an embodiment of the present invention.

DESCRIPTION OF THE PREFERRED EMBODIMENTS

Figure 1:
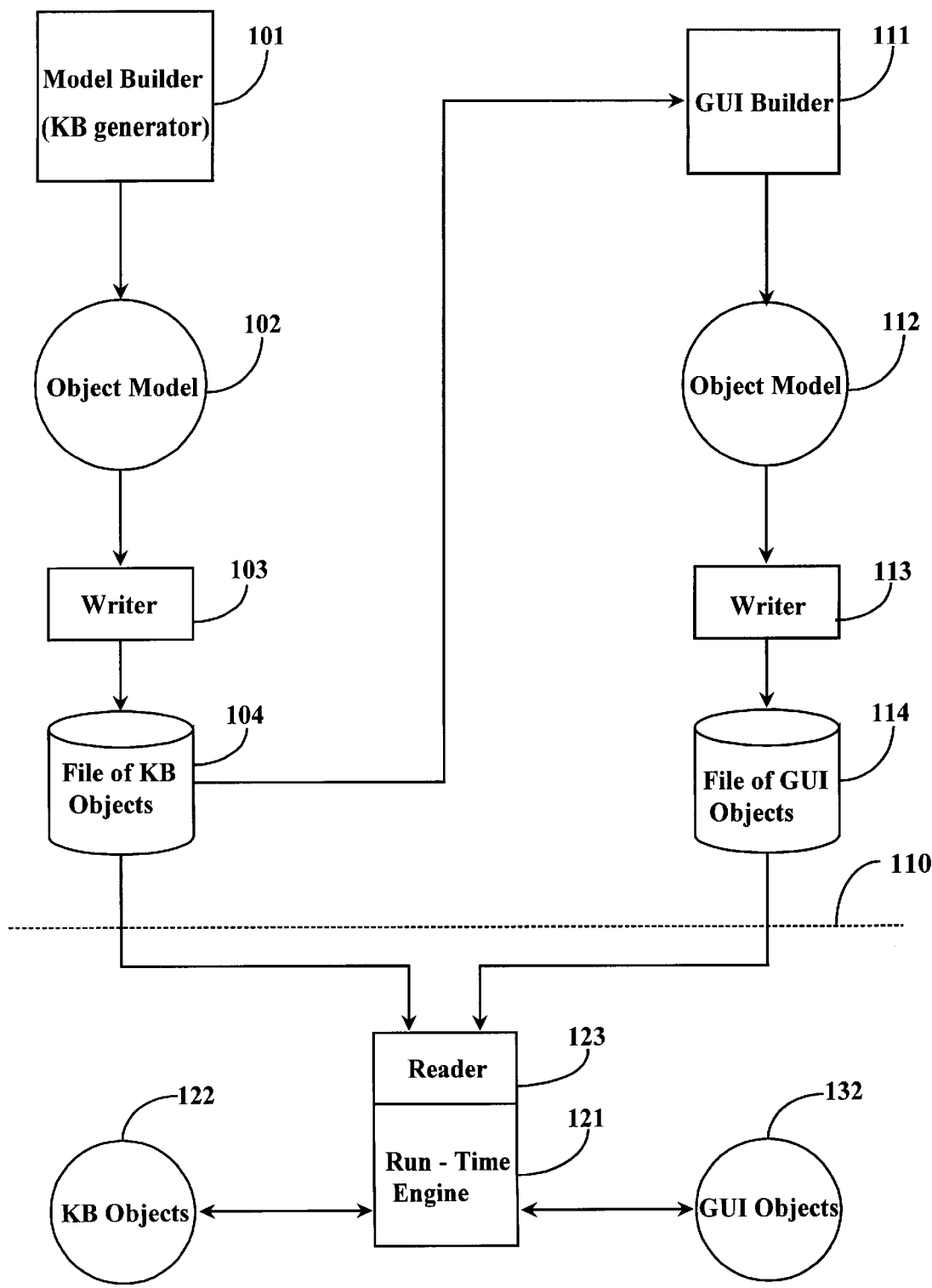

FIG. 1 is a flow chart illustrating a knowledge base work flow application according to an embodiment of the present invention wherein both knowledge base objects and GUI objects are generated and presented to a client by an advertiser or seller of a product.

A knowledge base generator or model builder 101 is used at the sellers end to create a desired object model 102. As described briefly with reference to the background section, object model 102 contains all of the information related to the represented object or product such as dimensions, colors, styles, pricing and the like. Model builder 101 is a software tool known to the inventor in the art of generating knowledge bases.

In a preferred embodiment of the present invention a programming language such as Java or C+ is used in the building of object model 102. The reason for this is because these languages are relatively universal and usable among different platforms. It will be apparent to one with skill in the art that many different programming languages could be used in creating object model 102 without departing from the spirit and scope of the present invention such as Perl or Visual Basic. The languages mentioned above are used in a preferred embodiment for reasons described above.

A unique and innovative method according to an embodiment of the present invention is initiated by using a model-converting writer 103 to write object model 102 into the form of a collection of human readable ASCII files. Such files are commonly referred to by those with skill in the art as flat files, and are typically human readable and sensical. A flat file 104 which is an ASCII file containing knowledge base objects that have been converted and written by model-converting writer 103 can be transported to the client over the Internet or another type of network. Flat file 104 is an external media type file that can be read by a computer program or by a person. Therefore the recreation or modification of the object models can be automated or manual. Also, communications across different platforms is sometimes "intransparent", meaning only human readable files can be transferred. Other file types, such as binary files, can contain characters that would be interpreted by either entity (sending or receiving computer) as commands, including such commands that can disrupt or terminate such communications.

Flat file 104 in an embodiment of the invention is used as a source for a GUI builder 111 in the process of building a GUI object model 112. GUI-object model 112 insures that there are graphical or visual representations of the appropriate parts of object model 102. Using a conversion-model writer 113, GUI-object models are written into the form of a human-readable ASCII flat file along with some optional multimedia files for filling in the GUI that can then be sent to a client.

The incorporation of a human readable, ASCII format into the knowledge base process allows for the transporting of the associated information across different computer platforms as well as allowing for the use of differing languages. This unique method utilizes known software applications such as model-converting writers 103, and 113 and enhances them with the capability of converting the object models into flat files as explained and taught above.

In FIG. 1, dotted line 110 represents a network transmission interface, such as transmission of files to a client via an Internet connection. Those steps and processes appearing above line 110 are on the seller's side, and those below are on the client's side. Presumably, in the case of the Internet, the client has accessed the seller's Internet site, and is capable of downloading selected information. Whether or not the information downloaded is useful to the client is an issue addressed by the present invention.

At the client's end, a reader application 123 reads the flat files downloaded from the advertiser's site and rebuilds these files into objects for a knowledge-based configurator known in the art as a run-time engine 121. Run-time engine 121 converts flat files 104 and 114 back into knowledge base objects 122 and GUI objects 132 which are the same as object models 102 and 104. For example, if the same programming language and environment is used in run-time engine 121 as in model builder 101, then knowledge base 122 will be identical to object model 102 both binaurally and descriptively. The same relationship can be concluded with regards to GUI objects 132 and object model 112. If a different language and environment is used in run-time generator 121 that that used in model builder 101, then the files are not binaurally identical, but will accurately describe the same object.

A process of the present invention as described above could be used to up-date configurator systems such as run-time engine 121. Editing or changing rules could be done from within the knowledge base instead of from within the object model via the addition of a reader that reads the flat file back into object model 102.

It will be apparent to one with skill in the art that a method of the present invention such as described with reference to FIG. 1 could use a variety of different programming languages as known in the art without departing from the spirit and scope of the present invention. It will also be apparent to one with skill in the art that the method of the present invention may be adapted to be transported across a variety of known computer platforms without departing from the spirit and scope of the present invention. For example a client using a windows operating system may download and configure ASCII files that were generated in a UNIX environment and so on.

The spirit and scope of the present invention is limited only by the claims that follow.

What is claimed is:

1. A method for transporting a knowledge-based object model from a source platform to a recipient platform via a data network, and for enabling the recipient to use the object model, comprising steps of:

(a) converting the object model into a first human-readable, non-binary text file at the source platform, the text file representing objects and object relationships;

(b) using the first text file to create a graphics user interface (GUI) object model at the source platform, GUI objects in the GUI model related to individual objects of the object model;

(c) converting the GUI object model into a second human-readable, non-binary text file at the source platform;

(d) relating the GUI objects to multimedia files;

(e) transporting the first and second text files and the multimedia files across the data network from the source platform to the recipient platform; and (f) reconstructing the object model and the GUI object model at the recipient platform from the human-readable text files.

2. The method of claim 1 wherein the source platform is a first Internet-connected computer and the recipient platform is a second Internet-connected computer, and in step (b) the text files and the multimedia files are transported across the Internet.

3. The method of claim 1 further comprising a step for a user, using an appropriate reader and software engine, to interface with the object model, the GUI object model, and the multimedia files at the recipient platform, selecting and viewing files representing objects in the object model.

4. A system for providing a knowledge-based object model to an end user, in a form the end-user can use the model selectively, comprising:

a first text file writer executing on the source platform, enabled to convert the object model to a first non-binary text file;

an object model generator executing on the source platform, enabled to create a GUI object model with GUI objects related to objects of the object model from the first text file;

a second text file writer executing on the source platform enabled to convert the GUI object model to a second non-binary text file, and to relate objects of the GUI model to multimedia files; and a reader and software engine executing on a recipient platform connected by a network connection to the source platform, enabled to reconstruct the object model and the GUI object model on the recipient platform;

wherein the first text file writer converts the object model to a non-binary text file, the object model generator creates the GUI object model from the first text file, the second text file writer converts the GUI model to a second non-binary text file and relates objects in the second file to multimedia files, the source platform sends the two text files and multimedia files to the recipient platform, and the reader and software at the recipient platform recreates the object model and the GUI object model from the text files, enabling a user to select and view objects in the object models.

5. The system of claim 4 wherein the network connection is the Internet, and the source platform and the recipient platform are both computers connected to the Internet.

* * * * *